US010466033B2

(12) United States Patent
Zhao et al.

(10) Patent No.: US 10,466,033 B2
(45) Date of Patent: Nov. 5, 2019

(54) DEVICE, METHOD AND APPARATUS FOR MEASURING SIZE OF OBJECT

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventors: Gang Zhao, Beijing (CN); Peng Qiu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 110 days.

(21) Appl. No.: 15/563,031

(22) PCT Filed: Mar. 28, 2016

(86) PCT No.: PCT/CN2016/077460
§ 371 (c)(1),
(2) Date: Sep. 29, 2017

(87) PCT Pub. No.: WO2016/155585
PCT Pub. Date: Oct. 6, 2016

(65) Prior Publication Data
US 2018/0347962 A1    Dec. 6, 2018

(30) Foreign Application Priority Data

Mar. 31, 2015  (CN) .......................... 2015 1 0147720

(51) Int. Cl.
*G01B 11/02*    (2006.01)
*G01B 11/22*    (2006.01)

(52) U.S. Cl.
CPC .............. *G01B 11/02* (2013.01); *G01B 11/22* (2013.01)

(58) Field of Classification Search
CPC ................................ G01B 11/02; G01B 11/22
See application file for complete search history.

(56) References Cited

U.S. PATENT DOCUMENTS

| 2004/0151068 | A1* | 8/2004 | Carlsruh | .............. | G01B 11/026 |
| | | | | | 367/99 |
| 2012/0257214 | A1* | 10/2012 | Kuroda | .................... | G01D 5/38 |
| | | | | | 356/499 |
| 2014/0111621 | A1* | 4/2014 | Sneyders | ........... | G01B 11/2545 |
| | | | | | 348/46 |

FOREIGN PATENT DOCUMENTS

| CN | 1150242 A | 5/1997 |
| CN | 103206919 A | 7/2013 |

(Continued)

OTHER PUBLICATIONS

International Search Report with English translation and Written Opinion for Application No. PCT/CN2016/077460 dated May 24, 2016 (13 pages).

*Primary Examiner* — Hina F Ayub
*Assistant Examiner* — Amanda Merlino
(74) *Attorney, Agent, or Firm* — Michael Best & Friedrich LLP

(57) ABSTRACT

An apparatus, method and device for measuring the size of an object, comprising a depth sensor (2), a sensor bracket (1), a correction assistance apparatus (5), an object placement platform (4) and a computer (3). The correction assistance apparatus (5) is used for assisting in the correction of a plane of the depth sensor (2), comprises a fabric or a printing substance having black-and-white chessboard textures, and comprises a transparent flat plate, the fabric or the printing substance being laid on the object placement plat- (Continued)

form (4), and the transparent flat plate being pressed against the fabric or the printing substance. The depth sensor (2) is disposed on the sensor bracket (1) and is located in a space above the object placement platform (4). The computer (3) is connected to the depth sensor (2). The device and the method contribute to efficient and accurate calculation of the size of an object.

10 Claims, 2 Drawing Sheets

(56) References Cited

FOREIGN PATENT DOCUMENTS

| CN | 104330038 A | | 2/2015 |
|----|-------------|---|--------|
| CN | 204881572 U | | 12/2015 |
| EP | 2722656 A1 | | 4/2014 |
| JP | 2014163833 A | * | 9/2014 |

* cited by examiner

DEVICE, METHOD AND APPARATUS FOR MEASURING SIZE OF OBJECT

CROSS-REFERENCE TO RELATED APPLICATIONS

This application is a national stage filing under 35 U.S.C. 371 of International Application No. PCT/CN2016/077460 filed Mar. 28, 2016, which claims the foreign priority benefit of Chinese Patent Application No. 201510147720.5 filed Mar. 31, 2015, which are incorporated by reference herein in their entireties.

TECHNICAL FIELD

The present invention relates to the technical field of computer, in particular to a device, a method and an apparatus for measuring the size of an object.

BACKGROUND ART

At present, a common manner of measuring the size of goods, if necessary, when they are put in storage, is manual measurement, and the efficiency and accuracy of such manner are low. The accuracy of manual measurement is lower especially for goods having an irregular shape.

SUMMARY OF INVENTION

For this reason, the present invention provides a device, a method and an apparatus for measuring the size of an object, which helps to calculate the size of an object efficiently and accurately.

In order to realize the above purpose, according to one aspect of the present invention, a device for measuring the size of an object is provided.

The device for measuring the size of an object in the present invention comprises: a depth sensor, a sensor bracket, a correction assistance means, an object placement platform and a computer, wherein the correction assistance means is used for assisting in correcting a plane of the depth sensor and includes fabrics or prints having black-and-white chessboard textures, as well as a transparent flat plate, the fabrics or prints being laid on the object placement platform, and the transparent flat plate being pressed against the fabrics or prints; the depth sensor is disposed on the sensor bracket and is located in a space above the object placement platform; the computer is connected to the depth sensor.

Alternatively, the sensor bracket is composed of a vertical bar and a horizontal bar which are connected with each other and form a right angle; the depth sensor is fixed in proximity to a free end of the horizontal bar; the computer is fixed on the vertical bar; and the vertical bar is fixed on the object placement platform.

Alternatively, the object placement platform has four legs each having a wheel at its end portion; and the device further comprises a handle connected to the object placement platform.

Alternatively, the depth sensor is connected to the computer via a USB interface; and the handheld barcode scanner is connected to the computer via a USB interface.

According to another aspect of the present invention, a method for measuring the size of an object is provided.

The method for measuring the size of an object in the present invention is applied to the device for measuring the size of an object in the present invention. The method comprises: taking, by the depth sensor, a picture of the correction assistance means, and measuring the spatial coordinates of an upper surface of the correction assistance means; determining, by the computer, a distance from the correction assistance means to the depth sensor based on the picture and the spatial coordinates; after an object to be measured is placed on the correction assistance means, sending, by the depth sensor, a detected depth map to the computer; calculating, by the computer, a height H of the object to be measured according to H=D−d−h in which D represents the distance from the correction assistance means to the depth sensor, d represents a minimum depth value in the detected depth map, and h represents a thickness of the transparent flat plate; and determining, by the computer, a bounding rectangle of pixels all of which have a depth greater than d and smaller than D−h in the depth map, the length and width of the bounding rectangle being used as the length and width of the object to be measured.

Alternatively, the step of determining the distance from the correction assistance means to the depth sensor includes: obtaining the distance from the correction assistance means to the depth sensor by solving a PnP problem based on coordinates of predetermined labeled points in the picture and the spatial coordinates.

Alternatively, the method further comprises: the computer outputs the height, length and width of the object to be measured in an order of magnitude.

According to another aspect of the present invention, an apparatus for measuring the size of an object is provided.

The apparatus for measuring the size of an object in the present invention is used for implementing the method for measuring the size of an object in the present invention. The apparatus comprises: a first receiving module for receiving the picture of the correction assistance means taken by the depth sensor and the spatial coordinates of the upper surface of the correction assistance means measured by the depth sensor; a first calculating module for determining the distance from the correction assistance means to the depth sensor based on the picture and the spatial coordinates; a second receiving module for receiving the depth map detected by the depth sensor after the object to be measured is placed on the correction assistance means; a second calculating module for calculating the height H of the object, to be measured according to H=D−d−h, in which D represents the distance from the correction assistance means to the depth sensor, d represents the minimum depth value in the detected depth map, and h represents the thickness of the transparent flat plate; a third calculating module for determining a bounding rectangle of pixels all of which have a depth greater than d and smaller than D−h in the depth map, the length and width of the bounding rectangle being used as the length and width of the object to be measured.

Alternatively, the first calculating module is further used for obtaining the distance from the correction assistance means to the depth sensor by solving a PnP problem based on coordinates of predetermined labeled points in the picture and the spatial coordinates.

Alternatively, the apparatus further comprises an output module for outputting the height, length and width of the object to be measured in an order of magnitude.

According to the technical solution of the present invention, the height as well the length and the width of an object to be measured can be obtained by placing the object to be measured under a depth sensor for depth measurement prior to being processed by the computer. Such manner does not require any person to perform manual measurement, improves the efficiency, and is more accurate than manual measurement.

BRIEF DESCRIPTION OF DRAWINGS

Drawings serve for better understanding of the present invention, but do not place any improper limitations on the present invention, wherein.

EMBODIMENTS OF THE INVENTION

Hereinafter, an exemplary embodiment of the present invention will be explained with reference to the drawings, including various details in the embodiment of the present invention so as to facilitate understanding, and they should be only regarded as exemplary. Therefore, those skilled in the art should realize that: various transformations and modifications can be made to the embodiment illustrated herein without deviating from the scope and spirit of the present invention. Likewise, for the sake of clearness and conciseness, descriptions about common functions and structures are omitted in the following descriptions.

Figure 1:
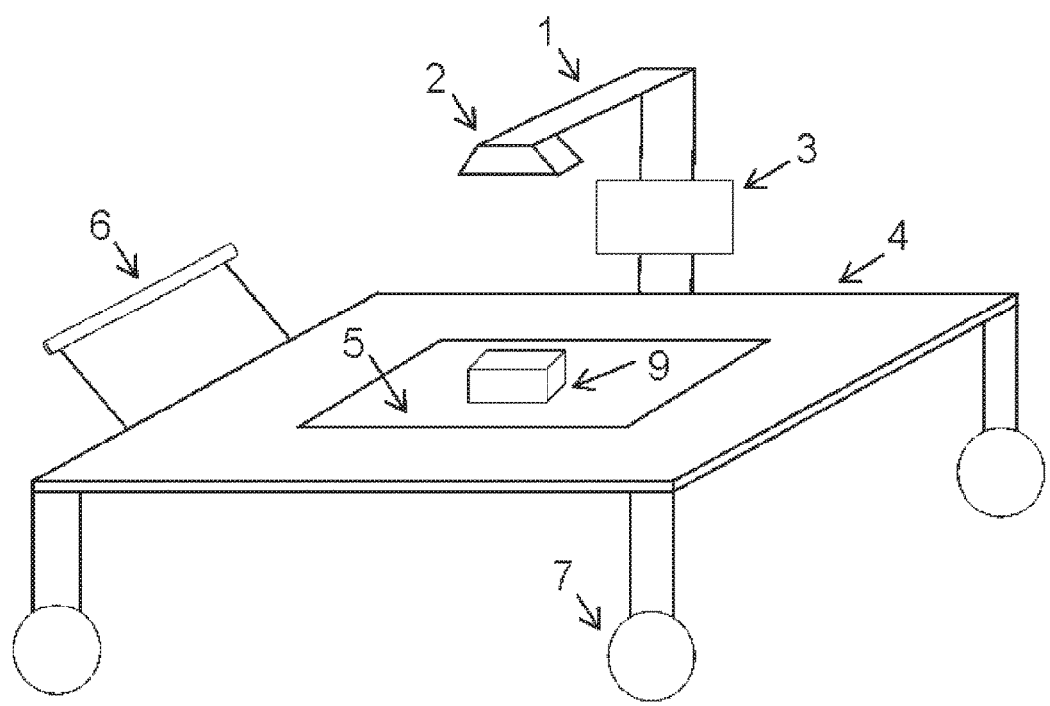
FIG. 1 is a schematic diagram illustrating a device for measuring the size of an object according to an embodiment of the present invention.

The device for measuring the size of an object in the embodiment of the present invention mainly comprises: a depth sensor, a sensor bracket, an object placement platform and a computer, wherein the depth sensor is placed on the sensor bracket and is located in a space above the object placement platform, and the computer is connected to the depth sensor. A preferable structure of the device is illustrated in FIG. 1, which is a schematic diagram illustrating the device for measuring the size of an object according to the embodiment of the present invention. As shown in FIG. 1, the device for measuring the size of an object mainly comprises a sensor bracket 1, a depth sensor 2, a computer 3, an object placement platform 4, a correction assistance means 5, a cart-pulling handle 6, a wheel 7 (there are four wheels and three wheels can be seen from the angle of view in the figure). The wheel, which is mounted at one end of a leg of the object placement platform, together with the cart-pulling handle 6, makes the device have a loading and transporting functionality of a cart. The sensor bracket 1 is composed of a vertical bar and a horizontal bar which are connected with each other and form a right angle, and is connected to the object placement platform 4. The depth sensor 2 shown in the figure is located in proximity to a free end of the horizontal bar. Based on the infrared measuring principle, the depth sensor obtains a distance from a point to the plane where the sensor resides by capturing reflection of this point against infrared rays in sight. The depth sensor emits a plurality of parallel infrared rays which are perpendicular to the plane of the depth sensor. The computer 3 is fixed on the vertical bar, and is located at one side of the vertical bar toward the object placement platform 4. Alternatively, the computer 3 may be also located at the other side of the vertical bar.

The correction assistance means 5 is used for correcting the depth sensor 2. Since it is difficult for the depth sensor to be completely parallel to the plane where the object placement platform resides during installation, correction is preferable. The correction assistance means is mainly formed by fabrics or prints having black-and-white chessboard textures and a transparent flat plate; the fabrics or prints (such as plastic sheet or paper) having black-and-white chessboard textures is laid on the object placement platform 4 before the transparent flat plate is pressed against the fabrics or prints such that the fabrics or prints are smooth. Herein, the black-and-white chessboard textures are similar to a chessboard, having alternating black and white rectangles (not shown) in each row and column. The transparent flat plate may be selected from a tempered glass plate or an organic glass plate, and an object to be measured 9 is placed on the transparent flat plate.

As for commodities in e-commerce, they are usually provided with barcodes. A handheld barcode scanner (not shown) may be connected to the computer 3, so as to scan the barcode on the object to be measured. The computer 3, which may be in the form of a so-called laptop or tablet, is connected to the depth sensor 2 and the barcode scanner respectively via USB interfaces.

Figure 2:
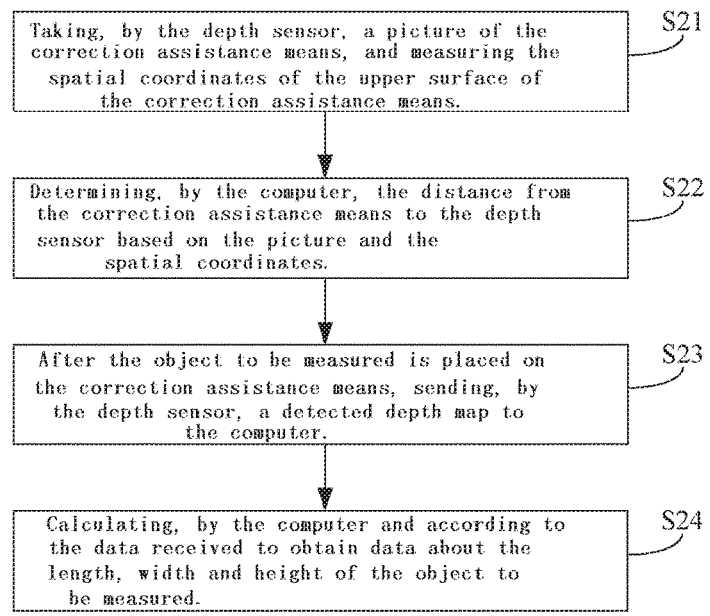
FIG. 2 is a schematic diagram illustrating the main steps of a method for measuring the size of an object according to an embodiment of the present invention.

FIG. 2 is a schematic diagram illustrating the main steps of the method for measuring the size of an object according to the embodiment of the present invention. The method is implemented based on the device for measuring the size of an object in FIG. 1.

Step S21: Taking, by the depth sensor, a picture of the correction assistance means, and measuring the spatial coordinates of the upper surface of the correction assistance means.

Step 22: Determining, by the computer, the distance from the correction assistance means to the depth sensor based on the picture and the spatial coordinates.

Step S23: After the object to be measured is placed on the correction assistance means, sending, by the depth sensor, a detected depth map to the computer.

Step S24: Calculating, by the computer and according to the data received to obtain data about the length, width and height of the object to be measured. In this step, the computer calculates the height H of the object to be measured according to H=D−d−h, in which D represents the distance from the correction assistance means to the depth sensor, d represents the minimum depth value in the detected depth map, and h represents the thickness of the transparent flat plate; and the computer determines a bounding rectangle of pixels all of which have a depth greater than d and smaller than D−h in the depth map, the length and width of the bounding rectangle being used as the length and width of the object to be measured. For a box in a regular cuboid shape, the obtained length and width are the length and width of the cuboid, for an object in an irregular shape, the obtained length and width are the length and width of a cuboid occupied by the object. The computer can output the data about the length, width and height obtained in the step in an order of magnitude for the reference of a goods classifying person.

Hereinafter, detailed explanations will be made about the above step. According to a pinhole imaging model, the relationship between a point Q with coordinates [X,Y, Z] in a real world and a pixel q in the picture satisfy the following:

$$q = MQ, \text{ in which } q = \begin{bmatrix} x \\ y \\ w \end{bmatrix}, M = \begin{bmatrix} f_x & 0 & c_x \\ 0 & f_y & c_y \\ 0 & 0 & 1 \end{bmatrix}, Q = \begin{bmatrix} X \\ Y \\ Z \end{bmatrix}$$

wherein x is the x-coordinate of the pixel, y is the y-coordinate of the pixel, w is the depth measured by the sensor, M is an intrinsic matrix of the camera. According to the above formula, any point in the picture can be mapped to the real world. Then, according to the formula for the distance between two points, a distance between any specified two points in the picture can be obtained.

In Step S22, in particular, the distance from the correction assistance means to the depth sensor is obtained by solving a PnP problem according to the coordinate of predetermined labeled points in the picture and the spatial coordinates. In other words, a picture of the correction assistance means is taken when no object to be measured is disposed on the device for measuring the size of an object. A distance D from the desktop of the cart to the depth sensor and the angle θ between the plane of the depth sensor and the plane where the correction assistance means resides can be obtained by solving a PnP problem based on the difference between the real coordinates of respective points on the correction assistance means and the measurement coordinates thereof measured by the camera. The PnP problem is a basic problem about camera calibration (for details, see the relevant documents in the prior art). In the embodiment, the input parameters of the PnP problem are the coordinates of the N label points on the correction assistance means. For example, if 5×7=35 label points are used and the output quantity is the angle θ, there may be three orthogonal angle components, wherein only a transverse component and a longitudinal component are used in the embodiment, and the angle component which rotates along the longitudinal axis is not used. With the angle θ, data obtained by the depth sensor can be corrected. In the embodiment, D and d as above are corrected by solving the PnP problem.

Figure 3:
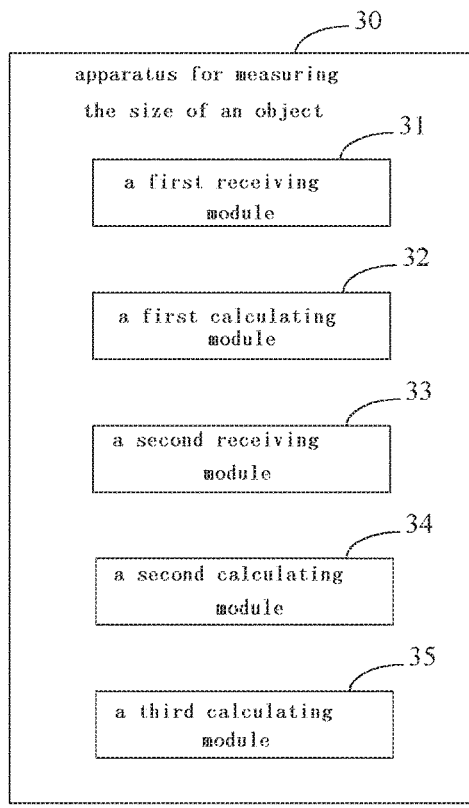
FIG. 3 is a schematic diagram illustrating the main modules of an apparatus for measuring the size of an object according to an embodiment of the present invention.

FIG. 3 is a schematic diagram illustrating the main modules of the apparatus for measuring the size of an object according to an embodiment of the present invention. The apparatus can be provided in the above computer as software, for implementing the method for measuring the size of an object in the embodiment. As shown in FIG. 3, the apparatus 30 for measuring the size of an object mainly comprises a first receiving module 31, a first calculating module 32, a second receiving module 33, a second calculating module 34, and a third calculating module 35.

The first receiving module 31 is used for receiving the picture of the correction assistance means taken by the depth sensor, and the spatial coordinates of the upper surface of the correction assistance means measured by the depth sensor; the first calculating module 32 is used for determining the distance from the correction assistance means to the depth sensor based on the picture and the spatial coordinates; the second receiving module 33 is used for receiving the depth map detected by the depth sensor after the object to be measured is placed on the correction assistance means the second calculating module 34 is used for calculating the height of the object to be measured according to H=D−d−h which D represents the distance from the correction assistance means to the depth sensor, d represents the minimum depth value in the detected depth map, and h represents the thickness of the transparent flat plate; the third calculating module 35 is used for determining a bounding rectangle of pixels all of which have a depth greater than d and smaller than D−h in the depth map, the length and width of the bounding rectangle being used as the length and width of the object to be measured.

The first calculating module 32 is further used for obtaining the distance from the correction assistance means to the depth sensor by solving the PnP problem according to the coordinate of the predetermined labeled points in the picture and the spatial coordinates.

The apparatus 30 for measuring the size of an object may further comprise an output module for outputting the height, length and width of the object to be measured in an order of magnitude.

According to the technical solution in the embodiment of the present invention, the height as well the length and the width of an object to be measured can be obtained by placing the object to be measured under the depth sensor for depth measurement prior to being processed by the computer. Such manner does not require any person to perform manual measurement, improves the efficiency, and is more accurate than manual measurement.

The basic principle of the present invention is described as above with reference to a specific embodiment. Obviously, the respective components or steps in the device and method of the present invention can be separated and/or recombined. Such separation and/or recombination should be regarded as an equivalent solution of the present invention. Furthermore, the steps of performing a sequence of processing as above can be naturally carried out in the described order and time order. However, it does not require that the steps must be carried out in the time order, and some steps may be carried out in parallel or independently of each other.

The above embodiments do not place limitations on the protection scope of the present invention. Those skilled in the art should be clear that various modifications, combinations, sub-combinations and substitutions can be made depending on the design requirements and other factors. Any modifications, equivalent substitutions, improvements and the like within the spirit and principle of the present invention should be included in the protection scope of the present invention.

The invention claimed is:

1. A device for measuring the size of an object, comprising: a depth sensor, a sensor bracket, a correction assistance means, an object placement platform, and a computer, wherein
    the correction assistance means is used for assisting in the correction of a plane of the depth sensor and includes fabrics or prints having black-and-white chessboard textures, as well as a transparent flat plate, the fabrics or prints being laid on the object placement platform, and the transparent flat plate being pressed against the fabrics or prints;
    the depth sensor is disposed on the sensor bracket and is located in a space above the object placement platform and is configured to take a picture of the correction assistance means, measure the spatial coordinates of an upper surface of the correction assistance means, and after an object to be measured is placed on the correction assistance means, send a detected depth map to the computer; and
    the computer is connected to the depth sensor and is configured to
        determine based on the picture and the spatial coordinates, a distance from the correction assistance means to the depth sensor,
        calculate a height H of the object to be measured according to H=D−d−h in which D represents the distance from the correction assistance means to the depth sensor, d represents a minimum depth value in the detected depth map, and h represents a thickness of the transparent flat plate, and
        determine a bounding rectangle of pixels all of which have a depth greater than d and smaller than D−h in the depth map, the length and width of the bounding rectangle being used as the length and width of the object to be measured.

2. The device according to claim 1, characterized in that:
the sensor bracket is composed of a vertical bar and a horizontal bar which are connected with each other and form a right angle;
the depth sensor is fixed in proximity to a free end of the horizontal bar;
the computer is fixed on the vertical bar; and
the vertical bar is fixed on the object placement platform.

3. The device according to claim 1, characterized in that:
the object placement platform has four legs each having a wheel at its end portion; and
the device further comprises a handle connected to the object placement platform.

4. The device according to claim 1, characterized in that:
the depth sensor is connected to the computer via a USB interface; and
a handheld barcode scanner is connected to the computer via a USB interface.

5. A method for measuring the size of an object, the method comprising:
taking, by a depth sensor disposed on a sensor bracket and located in a space above an object placement platform, a picture of a correction assistance means and measuring the spatial coordinates of an upper surface of the correction assistance means, the correction assistance means including fabrics or prints having black-and-white chessboard textures and a transparent flat plate, the fabrics or prints positioned on the object placement platform and the transparent flat plate positioned against the fabrics or prints;
determining, by a computer coupled to the depth sensor, based on the picture and the spatial coordinates, a distance from the correction assistance means to the depth sensor;
after an object to be measured is placed on the correction assistance means, sending, by the depth sensor, a detected depth map to the computer;
calculating, by the computer, a height H of the object to be measured according to H=D−d−h in which D represents the distance from the correction assistance means to the depth sensor, d represents a minimum depth value in the detected depth map, and h represents a thickness of the transparent flat plate; and
determining, by the computer, a bounding rectangle of pixels all of which have a depth greater than d and smaller than D−h in the depth map, the length and width of the bounding rectangle being used as the length and width of the object to be measured.

6. The method according to claim 5, characterized in that:
determining the distance from the correction assistance means to the depth sensor includes: obtaining the distance from the correction assistance means to the depth sensor by solving a PnP problem based on coordinates of predetermined labeled points in the picture and the spatial coordinates.

7. The method according to claim 5, further comprising: outputting, by the computer, the height, length and width of the object to be measured in an order of magnitude.

8. An apparatus for measuring the size of an object, characterized in that: the apparatus comprises:
a computer configured to
receive a picture of a correction assistance means taken by a the depth sensor disposed on a sensor bracket and located in a space above an object placement platform and spatial coordinates of an upper surface of the correction assistance means measured by the depth sensor, the correction assistance means including fabrics or prints having black-and-white chessboard textures and a transparent flat plate, the fabrics or prints positioned on the object placement platform and the transparent flat plate positioned against the fabrics or prints;
determine a distance from the correction assistance means to the depth sensor based on the picture and the spatial coordinates;
receive a depth map detected by the depth sensor after an object to be measured is placed on the correction assistance means;
calculate the height H of the object to be measured according to H=D−d−h, in which D represents the distance from the correction assistance means to the depth sensor, d represents the minimum depth value in the detected depth map, and h represents the thickness of the transparent flat plate; and
determine a bounding rectangle of pixels all of which have a depth greater than d and smaller than D−h in the depth map, the length and width of the bounding rectangle being used as the length and width of the object to be measured.

9. The apparatus according to claim 8, wherein the computer is further configured to obtain the distance from the correction assistance means to the depth sensor by solving a PnP problem based on coordinates of predetermined labeled points in the picture and the spatial coordinates.

10. The apparatus according to claim 8, wherein the computer is further configured to output the height, length and width of the object to be measured in an order of magnitude.

* * * * *